(12) United States Patent
Kalke et al.

(10) Patent No.: US 8,433,310 B2
(45) Date of Patent: Apr. 30, 2013

(54) SYSTEMS, METHODS, AND COMPUTER PROGRAM PRODUCTS FOR PROVIDING DEVICE UPDATES TO A MOBILE DEVICE OPERATING IN A WIRELESS TELECOMMUNICATIONS NETWORK

(75) Inventors: Catherine Kalke, Seattle, WA (US); Andrew Eberhart, Woodstock, GA (US); John Lewis, Lawrenceville, GA (US)

(73) Assignee: AT&T Mobility II LLC, Atlanta, GA (US)

(*) Notice: Subject to any disclaimer, the term of this patent is extended or adjusted under 35 U.S.C. 154(b) by 273 days.

(21) Appl. No.: 12/806,784

(22) Filed: Aug. 19, 2010

(65) Prior Publication Data
US 2012/0046022 A1 Feb. 23, 2012

(51) Int. Cl.
*H04M 3/00* (2006.01)
(52) U.S. Cl.
USPC ........ 455/419; 455/466; 455/412.1; 370/338; 370/392; 709/206; 709/217
(58) Field of Classification Search .................. 370/338, 370/522, 392, 310, 466; 714/727; 706/33; 360/77.2; 712/E9.051; 715/856; 707/999.202; 709/206, 217, 203, 223; 717/106; 455/466, 455/502, 67.11, 412.1, 418, 414.1
See application file for complete search history.

(56) References Cited

U.S. PATENT DOCUMENTS

| | | | |
|---|---|---|---|
| 6,694,145 B2 * | 2/2004 | Riikonen et al. | 455/502 |
| 7,546,576 B2 * | 6/2009 | Egli | 717/106 |
| 2002/0126708 A1 * | 9/2002 | Skog et al. | 370/522 |
| 2002/0191573 A1 * | 12/2002 | Whitehill et al. | 370/338 |
| 2003/0040280 A1 * | 2/2003 | Koskelainen | 455/67.1 |
| 2006/0184609 A1 * | 8/2006 | Deng | 709/203 |
| 2008/0010676 A1 * | 1/2008 | Dosa Racz et al. | 726/11 |
| 2008/0109528 A1 * | 5/2008 | Knight et al. | 709/217 |
| 2008/0305815 A1 * | 12/2008 | McDonough | 455/466 |
| 2009/0240807 A1 * | 9/2009 | Munson et al. | 709/226 |
| 2012/0005287 A1 * | 1/2012 | Gadel et al. | 709/206 |

* cited by examiner

*Primary Examiner* — Mahendra Patel
(74) *Attorney, Agent, or Firm* — Parks IP Law LLC; Mickki D. Murray Esq.

(57) ABSTRACT

Systems, methods, and computer program products are for generating a file including a set of instructions for handling a device update for the mobile device and a uniform resource locator (URL) of a server configured to host the device update and handle the device update in accordance with the instructions for handling the device update, and sending the file to the mobile device, whereat the file is redirected by the mobile device to the server based upon the URL included in the file.

17 Claims, 5 Drawing Sheets

SYSTEMS, METHODS, AND COMPUTER PROGRAM PRODUCTS FOR PROVIDING DEVICE UPDATES TO A MOBILE DEVICE OPERATING IN A WIRELESS TELECOMMUNICATIONS NETWORK

TECHNICAL FIELD

The present disclosure relates generally to wireless telecommunications and, more particularly, to systems, methods, and computer program products for providing device updates to mobile device operating in a wireless telecommunications network.

BACKGROUND

Mobile device management (MDM) is a set of technologies, protocols, and standards used for the remote management of mobile devices. MDM operations include, for example, firmware over the air updates (FOTA), device diagnostics, remote configuration, remote provisioning, remote locking, remote wiping, remote tracking, and the like.

SUMMARY

According to one aspect of the present disclosure, a system for providing a device update to a mobile device operating in a wireless telecommunications network includes a device management server configured to generate a file including a set of instructions for handling a device update for the mobile device and a uniform resource locator (URL) of a server configured to host the device update and handle the device update in accordance with the instructions for handling the device update, and send the file to the mobile device, whereat the file is redirected by the mobile device to the server based upon the URL included in the file.

In one embodiment, the device management server is further configured to send a wireless application protocol (WAP) push notification to the mobile device when the device update is available.

In one embodiment, the set of instructions for handling the device update for the mobile device include a required transport type for the device update. The required transport type indicates one or more transport types by which the device update must be delivered to the mobile device. In one embodiment, the required transport type is one of a 3G cellular technology, a 4G cellular technology, Wi-Fi, Wi-Max, Bluetooth, and wireline. In one embodiment, the required transport type includes two or more transport types and the set of instructions for handling the device update for the mobile device include a transport priority for each of the transport types. In one embodiment, the set of instructions for handling the device update for the mobile device include a time to live (TTL) for the required transport type.

In one embodiment, the set of instructions for handling the device update for the mobile device include a download option. In one embodiment, the download option is a temporal download option with which the device update must occur at a specified time or within a specified time period. In another embodiment, the download option is a forced condition option with which the device update must be provided to the mobile device. In another embodiment, the download option is a delayed download option with which download of the device update does not occur until a specific time or after a specific elapsed time.

In one embodiment, the set of instructions for handling the device update for the mobile device includes a back-off algorithm.

In one embodiment, the set of instructions for handling the device update for the mobile device includes a post update alert.

According to another aspect of the present disclosure, a method for providing a device update to a mobile device operating in a wireless telecommunications network includes generating a file including a set of instructions for handling a device update for the mobile device and a URL of a server configured to host the device update and handle the device update in accordance with the instructions for handling the device update. The method further includes sending the file to the mobile device, whereat the file is redirected by the mobile device to the server based upon the URL included in the file.

According to another aspect of the present disclosure, a computer-readable medium includes computer-readable instructions that, when executed by a processor of a device management server, cause the processor to perform the steps of the aforementioned method.

Other exemplary embodiments of the present disclosure are disclosed herein.

DETAILED DESCRIPTION

As required, detailed embodiments of the present disclosure are disclosed herein. It must be understood that the disclosed embodiments are merely exemplary examples of the disclosure that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

While the processes or methods described herein may, at times, be described in a general context of computer-executable instructions, the methods, procedures, and processes of the present disclosure can also be implemented in combination with other program modules and/or as a combination of hardware and software. The term application, or variants thereof, is used expansively herein to include routines, program modules, programs, components, data structures, algorithms, and the like. Applications can be implemented on various system configurations, including servers, network systems, single-processor or multiprocessor systems, minicomputers, mainframe computers, personal computers, handheld computing devices, mobile devices, microprocessor-based consumer electronics, programmable electronics, network elements, gateways, network functions, devices, combinations thereof, and the like.

Figure 1:
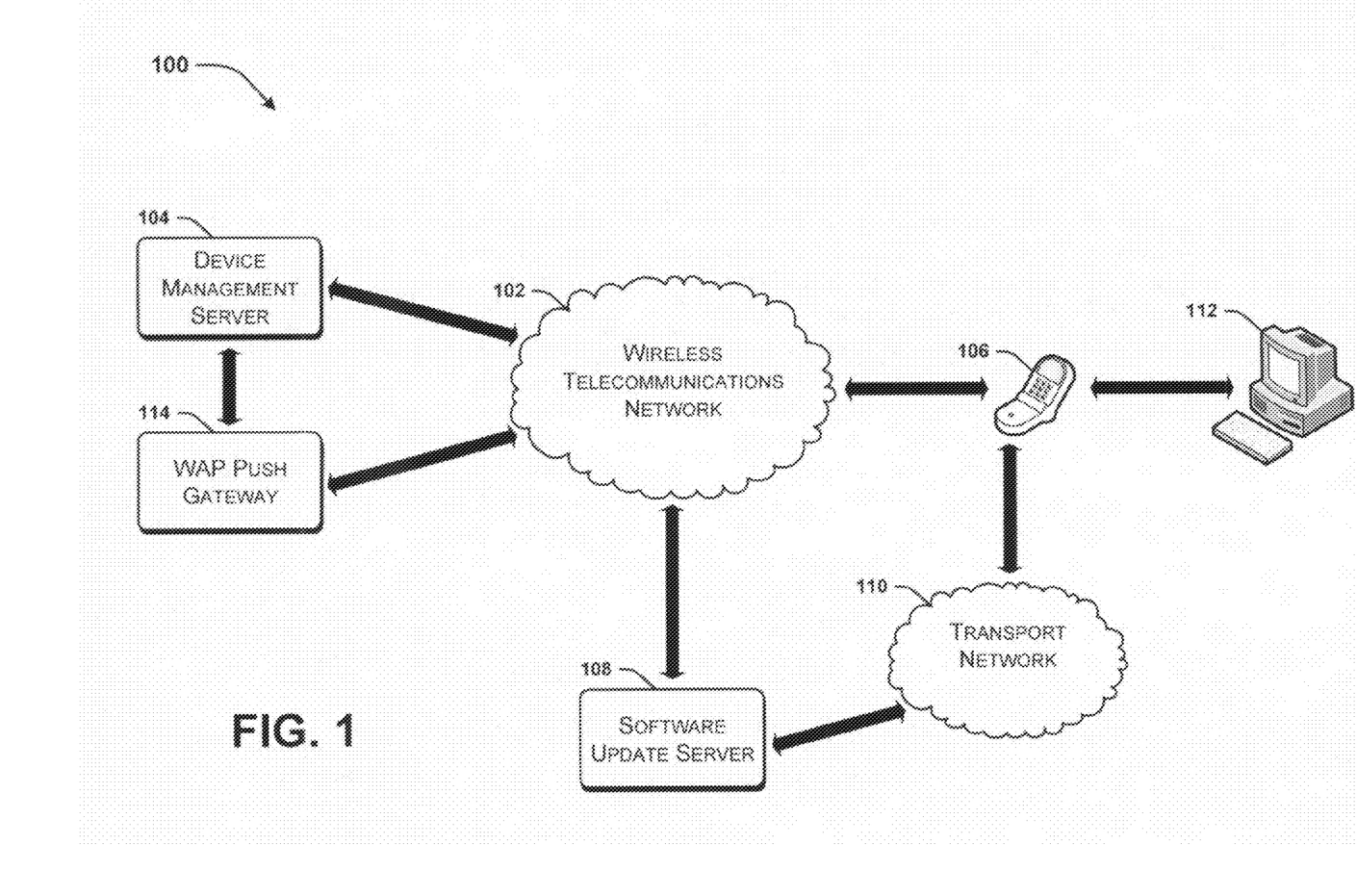
FIG. 1 schematically illustrates a network architecture, according to an exemplary embodiment of the present disclosure.

Referring now to the drawings in which like numerals represent like elements throughout the several views, FIG. 1 schematically illustrates a network architecture 100, according to an exemplary embodiment of the present disclosure. The illustrated network architecture 100 includes a wireless telecommunications network 102 with which a device management server (DMS) 104 is in communication to instruct a mobile device 106 to obtain a device update from a device update server 108. In one embodiment, the device update is a software update used to update a software component of the mobile device 106 such as an operating system or a specific application installed on the mobile device 106. In another embodiment, the device update is a firmware update used to update a firmware component of the mobile device 106.

The wireless telecommunications network 102, in one embodiment, functions in accordance with exemplary wireless telecommunications standards, such as Global System for Mobile communications (GSM) and a Universal Mobile Telecommunications System (UMTS). It should be understood, however, that the systems and methods described herein may be implemented in wireless networks that use any existing or yet to be developed telecommunications technology. Some examples of other suitable telecommunications technologies include, but are not limited to, networks utilizing Time Division Multiple Access (TDMA), Frequency Division Multiple Access (FDMA), Wideband Code Division Multiple Access (WCDMA), Orthogonal Frequency Division Multiplexing (OFDM), Long Term Evolution (LTE), and various other 2G, 2.5G, 3G, 4G, and greater generation technologies. Examples of suitable data bearers include, but are not limited to, General Packet Radio Service (GPRS), Enhanced Data rates for Global Evolution (EDGE), the High-Speed Packet Access (HSPA) protocol family, such as, High-Speed Downlink Packet Access (HSDPA), Enhanced Uplink (EUL) or otherwise termed High-Speed Uplink Packet Access (HSUPA), Evolved HSPA (HSPA+), and various other current and future data bearers.

The DMS 104 is configured to generate a device update file including a uniform resource locator (URL) of the device update server 108 whereat a device update for the mobile device 106 is stored. The device update server 108, in one embodiment, is an original equipment manufacturer (OEM) server. The URL is used by the mobile device 106 to redirect the device update file to the device update server 108. The device update file further includes a set of instructions for handling the device update. The set of instructions is used by the device update server 108 to handle the device update in accordance with specifications set by a mobile operator.

The DMS 104, in one embodiment, is a modified Open Mobile Alliance (OMA) device management (DM) server configured to operate in accordance with a modified protocol to include a URL in a device update file to instruct the mobile device 106 to the device update server 108. The device update file may be an extensible markup language (XML) file. Moreover, the device update file may be formatted as a modified firmware over-the-air (FOTA) initiation file.

The device update file, in one embodiment, includes, in addition to the URL of the device update server 108, a required transport type indicating a transport type over which the device update must be sent to the mobile device 106. The mobile operator may configure the device update file to include a required transport type other than a transport type offered by the wireless telecommunications network 102 to conserve network resources of the wireless telecommunications network 102. Such transport types may include transport types used by a transport network 110.

The transport network 110, in one embodiment, provides alternative wireless access to the device update server 108 for download of a device update via Wi-Fi or Wi-Max. Alternatively, the transport network 110 is a wireline network such as one provided by a cable company, a telephone company, or other service provider operating in the capacity of an Internet service provider (ISP) for facilitating the download of a device update to the mobile device. In this embodiment, the wireline network may be connected to a Wi-Fi router for providing Wi-Fi access to the mobile device 106 for download of a device update and/or provide Ethernet access to the mobile device 106 for the download. In one embodiment, a computer 112 is in communication with the transport network 110 to act as an intermediary between the mobile device 106 and the transport network 110 to facilitate download of a device update. For example, the mobile device 106 may be configured to communicate with the computer 112 via Bluetooth, infrared data association (irDA), or other short-range wireless communications technology to download a device update. As another example, the mobile device 106 may be configured to communicate with the computer 112 via universal serial bus (USB), firewire, Ethernet, or the wireline communications technology to download a device update.

In another embodiment, the required transport type is a wireless telecommunications network provided by another mobile operator with which the mobile operator has a roaming arrangement or specialized agreement for device updates. In yet another embodiment, the required transport type includes a geographical definition limiting a certain transport type to an operator-defined geographic location. For example, the required transport type may be a particular location within the wireless telecommunications network 102, such as a particular cell site or a location area including a plurality of cell sites in which the mobile operator finds it permissible to allow the download of a device update. In still another embodiment, the required transport type is a subset of the cellular technologies provided by the mobile operator in the wireless telecommunications network 102. The mobile operator may provide different network types but may require a particular network type for the download of a device update. For example, the mobile operator may provide multiple generation networks (e.g., 2/2.5G GSM/GPRS and 3G UMTS/HSPA) of which the mobile operator requires the 3G UMTS/HSPA network for the download of device updates.

In some embodiments, the required transport type is conditional based upon available download speed. For example, even though the mobile device 106 is capable of downloading a device update from the device update server 108 using the required transport type, the download speed available at a given time and/or location may not be favorable for the device update. In such instances, the device update server 108 may postpone providing the device update to the mobile device 106 until the mobile device 106 is accessible via the required transport type at or above a specified minimum download speed.

In addition to the required transport type, the mobile operator may define in the device update file a transport priority if two or more required transport type options are identified. For example, the mobile operator may include Wi-Fi and 3G UMTS/HSPA as being required transport type options for the download of a device update with Wi-Fi being given a higher priority if both transport types are available to the mobile device 106.

The device update file may further include a number of connection attempts to identify how many time the device update server 108 should attempt to connect to the mobile device 106 via a certain priority level transport type.

In addition to the required transport type, the device update file may further include a time-to-live (TTL) for each required transport type option. The TTL for each required transport type option allows the mobile operator to coordinate downloads via specific transport types for a specified TTL period.

The device update file may further include a target firmware/software version identifying the version of firmware/software on the target device (e.g., the mobile device 106) and the final firmware/software version to be loaded onto the mobile device 106 via the device update.

The device update file may further include a target device name identifying a user-defined name for the target device, an operator-defined name for the target device, a make and/or model name of the target device, an International Mobile Equipment Identity (IMEI) of the target device, or other moniker used to identify the target device to the mobile operator and the device update server 108.

The device update file may further include a download option for the device update. In one embodiment, the download option is a temporal download option defining a specific time or specific time period within which the device update must be downloaded to the mobile device 106. In another embodiment, the download option is a forced condition option that forces the mobile device 106 to be updated. This is useful for situations in which a device update is required by the mobile operator for security or other reasons. In yet another embodiment, the download option is a delayed download option that prevents the device update from being downloaded until a specified time. For example, the mobile operator may want to send out notification of a device update but strategically delay the download of the device update due to embargo or other reasons such as to conserve network resources.

The device update file may further include a device update option used to indicate that the device update is optional and not required.

The device update file may further include a back-off algorithm. The back-off algorithm may include two or more phases, each of which defines a wait time for receiving acknowledgement from the mobile device 106 and an attempt number which defines a number of attempts to try. The wait time and/or number of attempts may gradually decrease (back-off) until the device update server 108 deems the update attempt a failure by timing out.

The device update file may further include a post update alert that is to be sent to the mobile device 106 after the device update is complete. The post update alert may include further instructions by the mobile operator to a user of the mobile device 106, customer service details including telephone number, email address, and the like, and/or a courtesy message thanking the user for downloading the device update.

Prior to the DMS 104 sending the device update file to the mobile device 106, the DMS 104, in one embodiment, sends an alert or notification message to the mobile device 106 to notify a user of the mobile device 106 of a pending device update and, in some embodiments, prompting the user to approve the DMS 104 initiating the device update process by first sending the device update file to the mobile device 106. The notification message, in one embodiment, is sent using a wireless application protocol (WAP) push notification procedure via a WAP push gateway 114.

Figure 2:
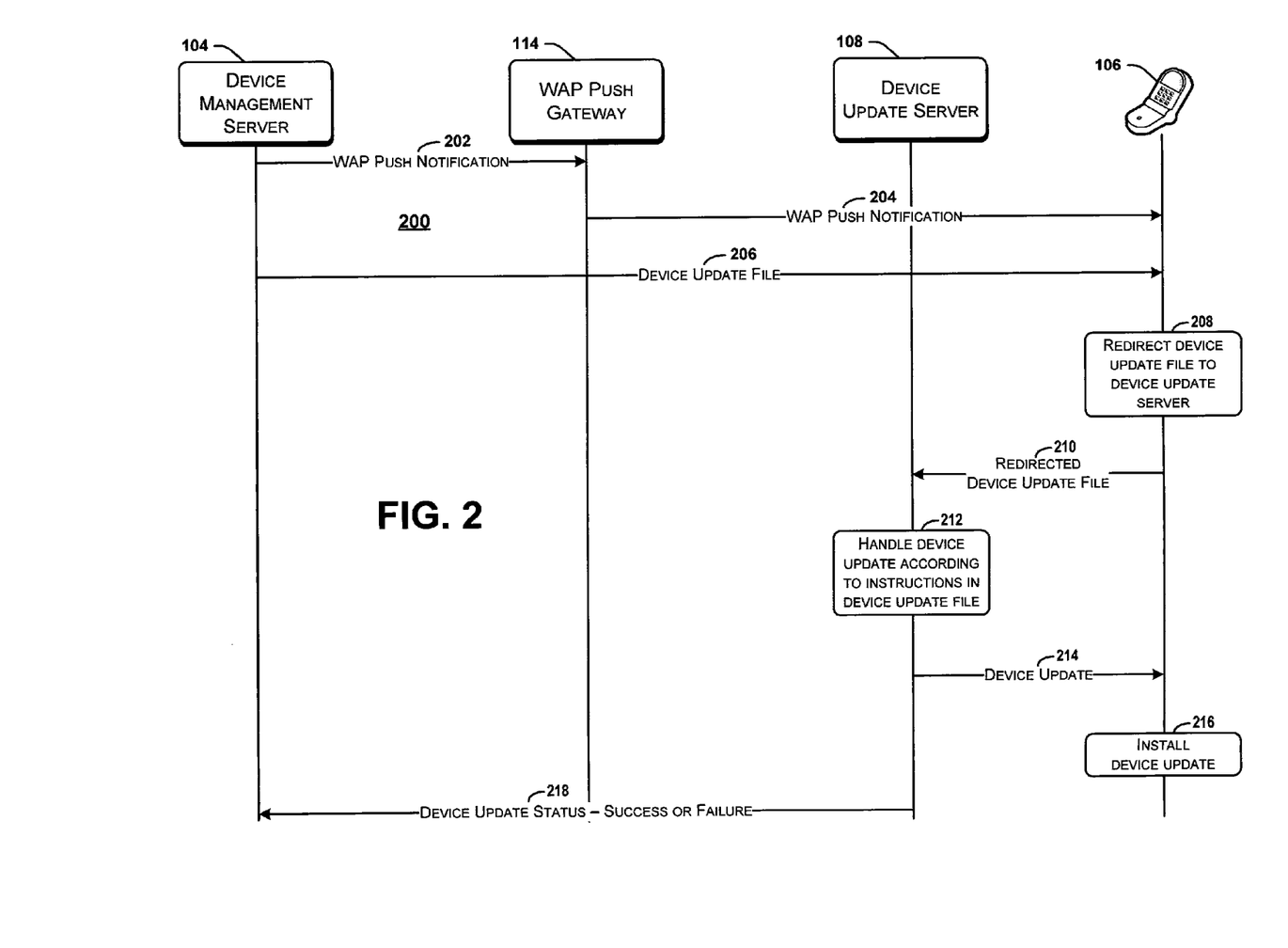
FIG. 2 schematically illustrates a message flow for a method for providing a device update to a mobile device, according to an exemplary embodiment of the present disclosure.

Turning now to FIG. 2, a message flow 200 for providing a device update to a mobile device is illustrated, according to an exemplary embodiment of the present disclosure. The message flow 200 includes the DMS 104, the WAP push gateway 114, the device update server 108, and the mobile device 106. In embodiments that include an initial WAP push notification, the DMS 104 sends, at step 202, a notification to the WAP push gateway 114 which, in turn, forwards, at step 204, the notification to the mobile device 106 over a short messaging service (SMS) bearer of the wireless telecommunications network 102, for example. A user of the mobile device 106 may be prompted to respond to the notification by, for example, accepting or denying the device update. Alternatively, the notification serves to notify the user that the device update file will be sent to the mobile device 106.

At step 206, the DMS 104 sends the device update file to the mobile device 106. At step 208, the mobile device 106 receives the device update file and reviews the contents of the file for instructions to redirect the file to a particular update server which, in the illustrated embodiment, is the device update serve 108. At step 210, the mobile device 106 sends the device update file to the device update server 108 via the URL included in the device update file.

At step 212, the device update server 108 receives the device update file and extracts the set of instructions for handling the device update and determines, based upon the instructions, how to handle the device update. The various instructions that may be included in the device update file are described above in detail.

At step 214, the device update server 108 sends the device update to the mobile device 106. At step 216, the mobile device 106 receives the device update from the device update server 108 and installs the device update. In one embodiment, the mobile device 106 acknowledges receipt of the device update and/or acknowledges successful installation of the device update to the device update server 108. At step 218, the device update server 108 returns a device update status to the DMS 104 indicating the success or failure of the device update. In an alternative embodiment, the mobile device 106 is configured to return the device update status.

Figure 3:
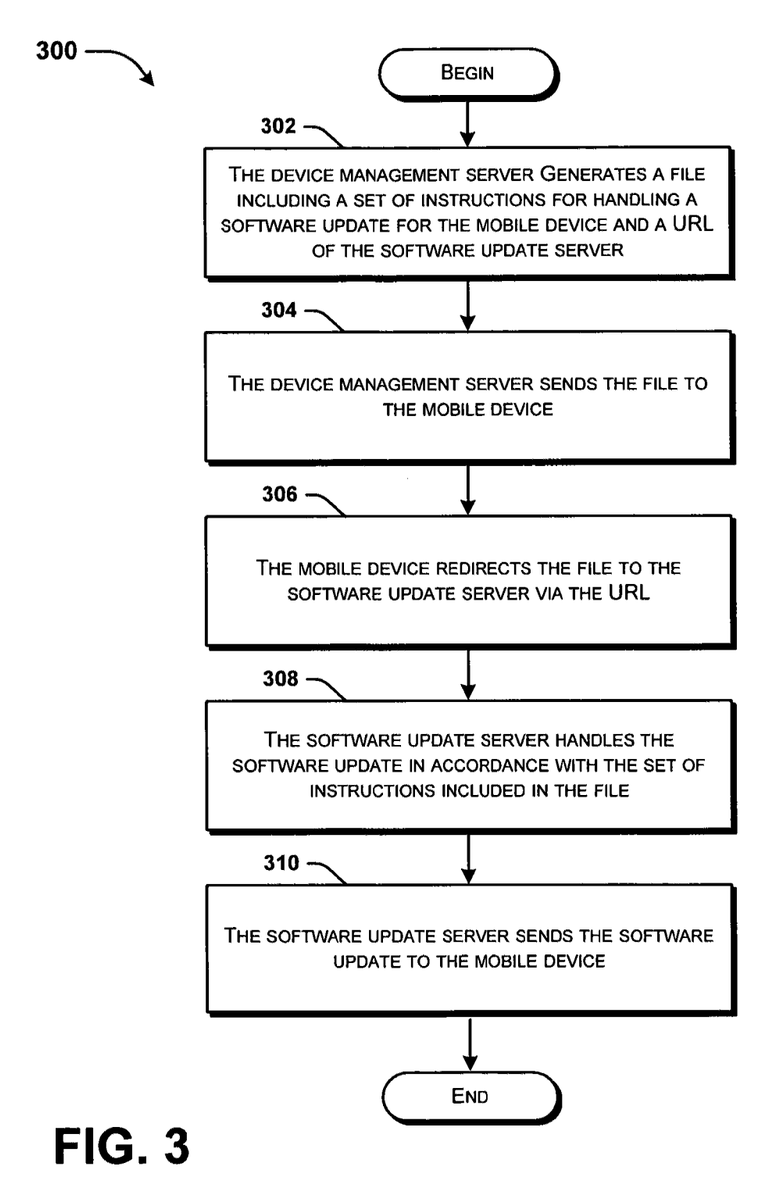
FIG. 3 illustrates a method for providing a device update to a mobile device, according to an exemplary embodiment of the present disclosure.

Referring now to FIG. 3, a method 300 for a method for providing a device update to a mobile device is illustrated, according to an embodiment of the present disclosure. It should be understood that the steps of the method 300 are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the illustrated method 300 can be ended at any time. In certain embodiments, some or all steps of this process, and/or substantially equivalent steps can be performed by execution of computer-readable instructions stored or included on a computer-readable medium.

The method 300 begins and proceeds to block 302, whereat the DMS 104 generates a file including a set of instructions for handling a device update for the mobile device 106 and a URL of the device update server 108. At block 304, the DMS 104 sends the file to the mobile device 106. At block 306, the mobile device 106 redirects the file to the device update server 108 via the URL. At block 308, the device update server 108 handles the device update in accordance with the set of instructions included in the file. At block 310, the device update server 108 sends the device update to the mobile device 106. At block 312, the mobile device installs the device update. At block 314, the device update server 108 sends a device update status including the success or failure of the device update to the DMS 104. The method 300 ends.

Figure 4:
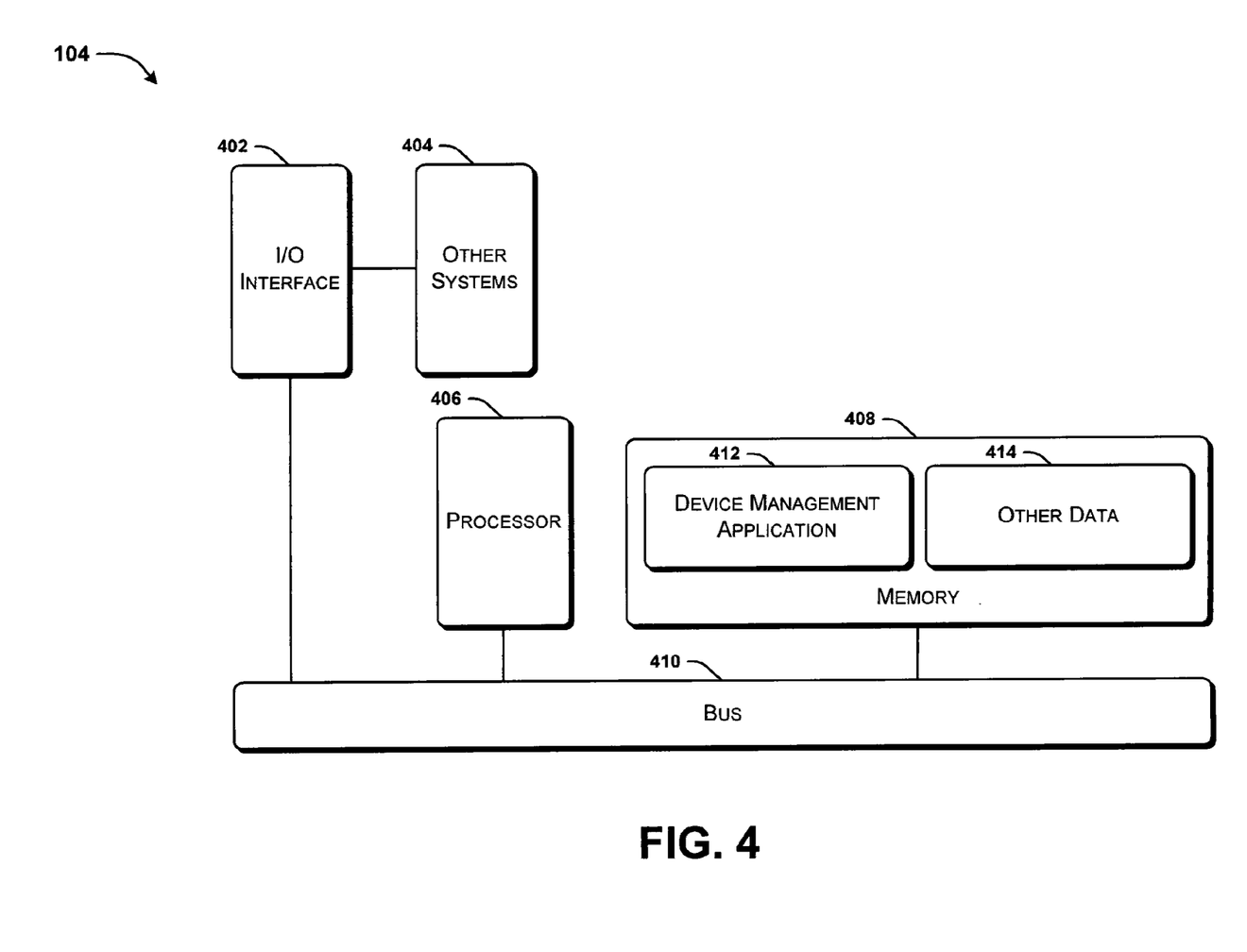
FIG. 4 schematically illustrates a device management server and components thereof, according to an exemplary embodiment of the present disclosure.

Turning now to FIG. 4, the device management server 104 and components thereof are illustrated, according to an embodiment of the present disclosure. Although connections are not shown between all components illustrated in FIG. 4, the components can interact with each other to carry out various system functions described herein. It should be understood that FIG. 4 and the following description are intended to provide a general description of a suitable environment in which the various aspects of some embodiments of the present disclosure can be implemented.

The DMS 104 includes an input/output interface 402 for facilitating communications between the DMS 104 and other systems 404, such as the device update server 108, the WAP push gateway 114, the mobile device 106, and systems or components of the wireless telecommunications network 102.

The DMS 104 also includes one or more processors 406 that are in communication with one or more memory modules 408 via one or more memory/data busses 410. The processor(s) 406 is configured to execute instructions of a device management application 412 stored on a non-transitory computer-readable medium, such as the illustrated memory module(s) 408, to facilitate the management of device updates for a mobile operator. In particular, the device management application 412 is configured to generate a device update file including a set of instructions for handling a device update for the mobile device and a URL of the device update server and send the device update file to the mobile device 106 via the I/O interface 402. The device management application 412 can be manipulated by the mobile operator to populate instructions in the device update file including, for example, required transport types, transport priority, TTL for each transport type, target device software/firmware version, final software/firmware version, download options, update options, back-off algorithm implementation, connection attempts, and post update alerts. These instructions and variants thereof are described in greater detail above with reference to FIG. 1.

The term "memory," as used herein to describe the memory module(s) 408, collectively includes all memory types associated with the DMS 104, such as, but not limited to, processor registers, processor cache, random access memory (RAM), other volatile memory forms, and non-volatile, semi-permanent or permanent memory types; for example, tape-based media, tangible optical media, solid state media, hard disks, combinations thereof, and the like. While the memory module(s) 408 is illustrated as residing proximate the processor(s) 406, it should be understood that the memory module(s) 408 is in some embodiments a remotely accessible storage system. Moreover, the memory module(s) 408 is intended to encompass network memory and/or other storage devices in wired or wireless communication with the DMS 104.

The memory module(s) 408 may also store other data 414, which may include available software/firmware versions for various device makes/models configured to operate with the wireless telecommunications network 102 (e.g., all device offered with service provided by the mobile operator), and current software/firmware versions for each device currently operating with service provided by the mobile operator. The other data 414 may be remotely sourced via the I/O interface 402 from network components such as a mobile equipment database configured to such information.

Figure 5:
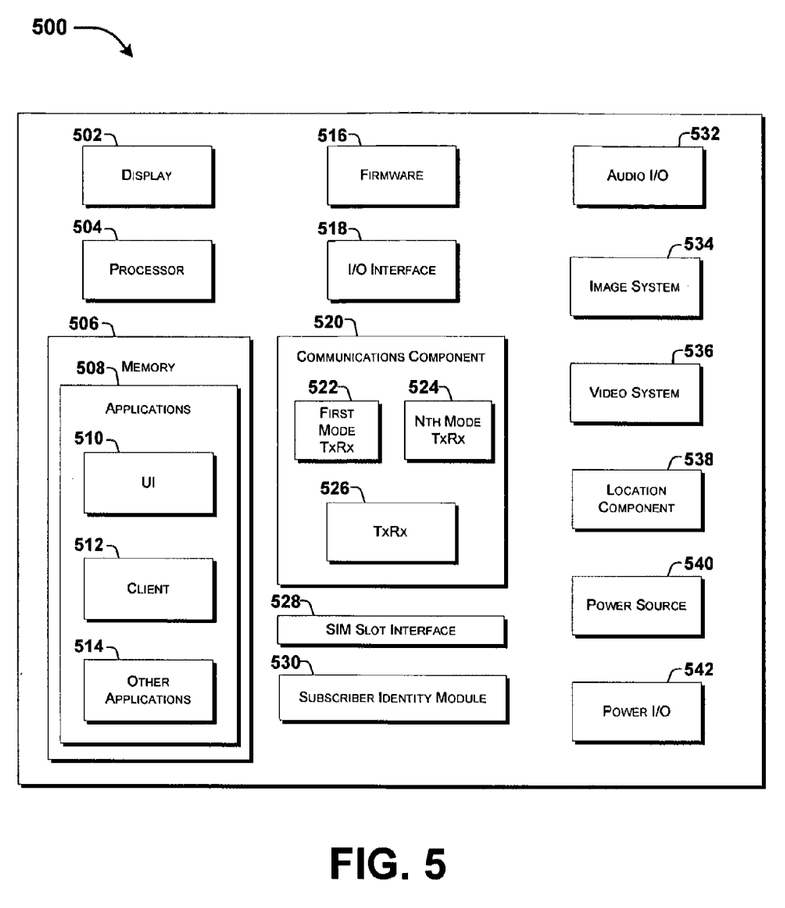
FIG. 5 schematically illustrates an exemplary mobile communications device and components thereof, according to an embodiment of the present disclosure.

Referring now to FIG. 5, a schematic block diagram of an exemplary mobile device 500 is illustrated. Although connections are not shown between the components illustrated in FIG. 5, the components can interact with each other to carry out device functions. In some embodiments, for example, the components are arranged so as to communicate via one or more busses (not shown). It should be understood that FIG. 5 and the following description are intended to provide a general understanding of a suitable environment in which various aspects of embodiments of the present disclosure can be implemented.

In some embodiments, the mobile device 106 illustrated in FIG. 1 is configured like the illustrated mobile device 500, now described. In some embodiments, the mobile device 500 is a multimode headset configured to provide access to more than one network type including, for example, the telecommunications technologies described above and/or other technologies such as Wi-Fi and WiMAX or others of the transport network 110.

In some embodiments, the mobile device 500 includes computer-readable media, including, for example, volatile media, non-volatile media, removable media, and non-removable media. The term "computer-readable media" and variants thereof, as used herein, refer to storage media and communication media. In some embodiments, storage media includes volatile and/or non-volatile, removable, and/or non-removable media. For example, storage media includes random access memory (RAM), read-only memory (ROM), electrically erasable programmable read-only memory (EEPROM), solid state memory or other memory technology, CD ROM, DVD, or other optical disk storage, magnetic tape, magnetic disk storage or other magnetic storage devices, or any other tangible, non-transitory medium that can be used to store the desired information and that can be accessed by the mobile device 500.

As illustrated in FIG. 5, the mobile device 500 includes a display 502 for displaying multimedia such as, for example, SMS messages, multimedia messaging service (MMS) messages, customer service messages, over-the-air (OTA) messages, unstructured supplementary service data (USSD) messages, voicemail notification messages, application graphical user interfaces (GUIs), text, images, video, telephony functions, such as Caller ID data, setup functions, menus), music, metadata, wallpaper, graphics, Internet content, device status, preferences settings, map and location data, profile (e.g., vibrate, silent, loud) selection, and the like.

The illustrated mobile device 500 also includes a processor 504 for processing data and/or executing computer-executable instructions of one or more applications 508 stored in a memory 506. In some embodiments, the application(s) 506 include a user interface (UI) application 510. The UI application 510 interfaces with a client 512 (e.g., an operating system (OS)) to facilitate user interaction with device functionality and data. In some embodiments, the client 512 is one of Symbian OS, Microsoft® Windows® Mobile OS (available from Microsoft Corporation of Redmond, Wash.), Palm® webOS™ (available from Palm Corporation of Sunnyvale, Calif.), Palm® OS (available from Palm Corporation), RIM® BlackBerry® OS (available from Research In Motion Limited of Waterloo, Ontario, Canada), Apple® iPhone® OS (available from Apple Corporation of Cupertino, Calif.), or Google Android™ OS (available from Google Inc. of Mountain View, Calif.). These operating systems are merely exemplary of the operating systems that may be used in accordance with the embodiments disclosed herein.

The UI application 510 aids a user in activating service OTA, if applicable, entering message content, viewing received messages (e.g., MMS messages, SMS messages, USSD messages, OTA messages), answering/initiating calls, entering/deleting data, entering and setting user IDs and passwords for device access, configuring settings, manipulating address book content and/or settings, multimode interaction, interacting with other applications 514, and the like.

In some embodiments, the other applications 514 include, for example, visual voicemail applications, messaging applications (e.g., SMS, enhanced messaging service (EMS), MMS applications), presence applications, text-to-speech applications, speech-to-text applications, add-ons, plug-ins, email applications, music applications, video applications, camera applications, location service applications (LSAs), power conservation applications, game applications, productivity applications, entertainment applications, enterprise applications, combinations thereof, and the like. The applications 508 are stored in the memory 506 and/or in a firmware 516, and are executed by the processor 504. The firmware 516 may also store code for execution during device power up and power down operations. Any of the applications 508 and/or the firmware 516 may be updated using a device update in accordance with the message flow 200 and the method 300 described above with reference to FIGS. 2 and 3, respectively.

The illustrated mobile device 500 also includes an input/output (I/O) interface 518 for input/output of data, such as, for example, location information, presence status information, user IDs, passwords, and application initiation (start-up) requests. In some embodiments, the I/O interface 518 is a hardwire connection, such as, for example, a USB, mini-USB, audio jack, PS2, IEEE 1394, serial, parallel, Ethernet (RJ48) port, RJ11 port, or the like. In these embodiments, the mobile device 500 may communicate with the computer 112 to via the hardwire connection to download a device update. In some embodiments, the I/O interface 518 accepts other I/O devices such as, for example, keyboards, keypads, mice, interface tethers, stylus pens, printers, thumb drives, touch screens, multi-touch screens, touch pads, trackballs, joysticks, microphones, remote control devices, monitors, displays, liquid crystal displays (LCDs), combinations thereof, and the like. It should be appreciated that the I/O interface 518 may be used for communications between the mobile device 500 and a network device or local device, instead of, or in addition to, a communications component 520.

The communications component 520 interfaces with the processor 504 to facilitate wired/wireless communications with external systems. Example external systems include, but are not limited to, the DMS 104, the device update server 108, the WAP push gateway 114, the wireless telecommunications network 102, the transport network 110, SMSCs, intranets, network databases, network storage systems, cellular networks, location servers, presence servers, Voice over Internet Protocol (VoIP) networks, local area networks (LANs), wide area networks (WANs), metropolitan area networks (MANs), personal area networks (PANs), and other networks, network components, and systems described herein. In some embodiments, the external systems are implemented using Wi-Fi, WiMAX, combinations and/or improvements thereof, and the like. In some embodiments, the communications component 520 includes a multimode communications subsystem for providing cellular communications via different cellular technologies. In some embodiments, for example, a first cellular transceiver 522 operates in one mode, such as, GSM, and an Nth cellular transceiver 524 operates in a different mode, such as UMTS. While only two cellular transceivers 522, 524 are illustrated, it should be appreciated that a plurality of transceivers can be included.

The illustrated communications component 520 also includes an alternative communications transceiver 526 for use by other communications technologies such as, for example, Wi-Fi, Wi-Max, Bluetooth, infrared, infrared data association (IRDA), near field communications (NFC), RF, and the like. In some embodiments, the communications component 520 also facilitates reception from terrestrial radio networks, digital satellite radio networks, Internet-based radio services networks, combinations thereof, and the like.

The communications component 520 processes data from a network such as, for example, the Internet, an intranet (e.g., business intranet), a home broadband network, a Wi-Fi hotspot, and the like, via an Internet service provider (ISP), digital subscriber link (DSL) provider, or broadband provider. In some embodiments, the communications component 520 facilitates the transmission of authentication information from the mobile device 500 to a network for processing in accordance with the methods described herein.

The illustrated mobile device 500 also includes a SIM slot interface 528 for accommodating a SIM 530 such as, for example, a SIM card, a universal SIM (USIM) card, or a universal integrated circuit card (UICC) including one or more SIM applications (e.g., ISIM, SIM, USIM, CSIM). The SIM 530 is configured to store an international mobile subscriber identity (IMSI).

Audio capabilities for the mobile device 500 may be provided by an audio I/O component 532 that includes a speaker for the output of audio signals and a microphone to collect audio signals.

The mobile device 500 may also include an image capture and processing system 534 (image system). Photos may be obtained via an associated image capture subsystem of the image system 534, for example, a camera. The mobile device 500 may also include a video system 536 for capturing, processing, recording, modifying, and/or transmitting video content. Photos and videos obtained using the image system 534 and the video system 536, respectively, may be added as message content to an MMS message and sent to another mobile device.

The illustrated mobile device 500 also includes a location component 538 for sending and/or receiving signals such as, for example, GPS data, assisted GPS (A-GPS) data, Wi-Fi/Wi-Max and/or cellular network triangulation data, combinations thereof, and the like, for determining a location of the mobile device 500. The location component 538 may communicate with the communications component 520 to retrieve triangulation data for determining a location. In some embodiments, the location component 538 interfaces with cellular network nodes, telephone lines, satellites, location transmitters and/or beacons, wireless network transmitters and receivers, for example, Wi-Fi hotspots, radio transmitters, combinations thereof, and the like. Using the location component 538, the mobile device 500 obtains, generates, and/or receives data to identify its location, or transmits data used by other devices to determine the location of the mobile device 500.

The illustrated mobile device 500 also includes a power source 540, such as batteries and/or other power subsystem (AC or DC). The power source 540 may interface with an external power system or charging equipment via a power I/O component 542.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A system, for providing a device update to a mobile device, comprising:
 a processor; and
 a computer-readable storage device having stored thereon computer-executable instructions that, when executed by the processor, cause the processor to perform operations comprising:
  generating a file comprising a set of update instructions, for handling a device update for the mobile device, and a uniform resource locator of a server configured to host the device update and handle the device update in accordance with the update instructions;
  sending a wireless application protocol push notification to the mobile device; and
  sending the file to the mobile device to cause the device to, using the uniform resource locator included in the file, redirect the file to the server;
  wherein:
   the set of update instructions for handling the device update for the mobile device comprises:
    a required transport type indicating a transport type by which the device update must be delivered to the mobile device; and
    a download option selected from a group consisting of a temporal download option, a forced condition download option, and a delayed download option;
   the required transport type comprises at least two transport types; and
   the set of update instructions for handling the device update for the mobile device comprises a transport priority for each of the at least two transport types.

2. The system of claim 1, wherein the operation of sending the file to the mobile device is performed, according to the computer-executable instructions, in response to a request received from the mobile device, the request being made in response to the wireless application protocol push notification.

3. The system of claim 1, wherein the required transport type is selected from a group consisting of a 3G cellular technology, a 4G cellular technology, Wi-Fi, Wi-Max, Bluetooth, and wireline.

4. The system of claim 3, wherein the set of update instructions for handling the device update for the mobile device comprises a time-to-live indicator for the required transport type.

5. The system of claim 1, wherein the set of update instructions for handling the device update for the mobile device comprises the download option selected from the group consisting of the temporal download option according to which the device update must occur at the specified time or within the specified time period, the forced condition download option according to which the device update must be provided to the mobile device, and the delayed download option according to which download of the device update does not occur until the specific time.

6. The system of claim 1, wherein the set of update instructions for handling the device update for the mobile device comprises a back-off algorithm.

7. The system of claim 1, wherein the set of update instructions for handling the device update for the mobile device comprises a post update alert.

8. A method, for providing a device update to a mobile device, comprising:
 generating, by a device management server having a processor, a file comprising a set of update instructions, for handling a device update for the mobile device, and a uniform resource locator of a second server configured to host the device update and handle the device update in accordance with the update instructions for handling the device update;
 sending a wireless application protocol push notification to the mobile device; and
 sending, by the device management server, the file to the mobile device to cause the device to, using the uniform resource locator included in the file, redirect the file to the second server;
 wherein:
  the set of update instructions for handling the device update for the mobile device comprise:
   a required transport type indicating a transport type by which the device update must be delivered to the mobile device; and
   a download option selected from a group consisting of a temporal download option, a forced condition download option, and a delayed download option;
  the required transport type comprises at least two transport types; and
  the set of update instructions for handling the device update for the mobile device comprises a transport priority for each of the at least two transport types.

9. The method of claim 8, wherein sending the file to the mobile device is performed in response to a request received from the mobile device, the request being made in response to the wireless application protocol push notification.

10. The method of claim 8, wherein the required transport type indicates a transport type by which the device update must be delivered to the mobile device, and the required transport type is selected from a group consisting of a 3G cellular technology, a 4G cellular technology, Wi-Fi, Wi-Max, Bluetooth, and wireline.

11. The method of claim 10, wherein generating the file comprising the set of update instructions comprises generating the file comprising a time-to-live indicator for the required transport type.

12. The method of claim 8, wherein generating the file comprising the set of update instructions comprises generating the file comprising the download option selected from the group consisting of the temporal download option according to which the device update must occur at the specified time or within the specified time period, the forced condition download option according to which the device update must be provided to the mobile device, and the delayed download option according to which download of the device update does not occur until the specific time.

13. A computer-readable storage device comprising computer-executable instructions that, when executed by a processor of a device management server, cause the device management server to perform operations comprising:
 generating a file comprising a set of update instructions, for handling a device update for the mobile device, and a uniform resource locator of a second server configured to host the device update and handle the device update in accordance with the update instructions for handling the device update;

sending a wireless application protocol push notification to the mobile device; and sending the file to the mobile device to cause the device to, using the uniform resource locator included in the file, redirect the file to the second server;

wherein:

the set of update instructions for handling the device update for the mobile device comprises:

a required transport type indicating a transport type by which the device update must be delivered to the mobile device; and a download option selected from a group consisting of a temporal download option, a forced condition download option, and a delayed download option;

the required transport type comprises at least two transport types; and the set of update instructions for handling the device update for the mobile device comprises a transport priority for each of the at least two transport types.

14. The computer-readable storage device of claim 13, wherein the operation of sending the file to the mobile device is, according to the computer-executable instructions, performed in response to a request received from the mobile device, the request being made in response to the wireless application protocol push notification.

15. The computer-readable storage device of claim 13, wherein the operation of generating the file comprises generating the file comprising a required transport type for the device update, the required transport type indicating a transport type by which the device update must be delivered to the mobile device, and the required transport type is selected from a group consisting of a 3G cellular technology, a 4G cellular technology, Wi-Fi, Wi-Max, Bluetooth, and wireline.

16. The computer-readable storage device of claim 13, wherein the operation of generating the file comprises generating the file comprising a time-to-live indicator for the required transport type.

17. The computer-readable storage device of claim 13, wherein the operation of generating the file comprises generating the file comprising the download option selected from the group consisting of the temporal download option according to which the device update must occur at the specified time or within the specified time period, the forced condition download option according to which the device update must be provided to the mobile device, and the delayed download option according to which download of the device update does not occur until the specific time.

* * * * *